July 15, 1958 P. A. D'AURIAC 2,842,939
SHOCK ABSORBER FOR DOCKING SHIPS
Filed Oct. 14, 1953 2 Sheets-Sheet 1

INVENTOR
PAUL ANGLES D'AURIAC
BY George H. Borey
ATTORNEY

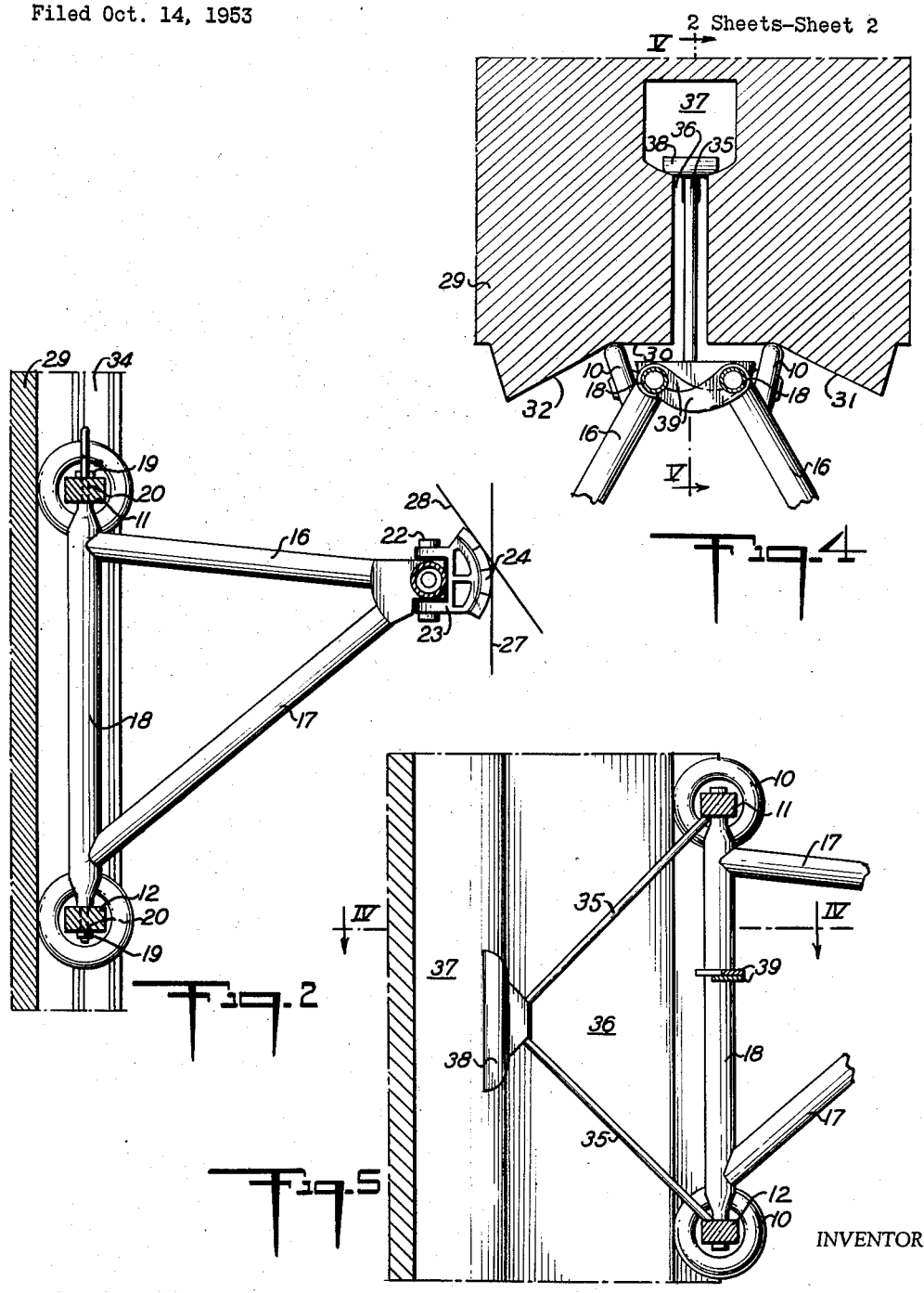

2,842,939

SHOCK ABSORBER FOR DOCKING OF SHIPS

Paul Angles D'Auriac, Grenoble, France, assignor to Etablissements Neyrpic, Grenoble, France, a corporation of France Application October 14, 1953, Serial No. 385,976

16 Claims. (Cl. 61—48)

This invention relates to a shock absorber for taking the impact of ships and other vessels in docking and mooring thereof.

It is known that during the operation of docking a ship, because of the speed of approach on the one hand, and after the ship has been docked, because of the movement imparted to the ship by swells, currents or the wind, on the other hand, shocks are produced by the ship hitting against the dock. In order to avoid damage to the ship as well as to the dock which is caused by such impacts, especially if they are severe, it has been a practice heretofore to interpose between the dock and the ship bodies capable of being deformed more or less under the force of the impact. The deformation imparted to such bodies is more or less temporary and presupposes a forward movement and a return movement in the absorber.

The forward movement may take place because of a kinematic structure providing more or less freedom of movement. This forward or shock absorbing movement in turn is checked either:

(a) By an elastic or resilient structure;
(b) By the action of gravity on masses which are lifted under the impact;
(c) By momentarily under the impact immersing into water a float which immediately tends to rise due to its buoyancy;
(d) By the effect of a dash-pot type of shock absorber.

In the first three cases the force checking the forward movement gives rise to the force tending to move the structure in the return direction.

In the fourth case, however, the same force opposes the return movement as that which opposed the forward movement, even though the dash-pot is not employed alone but in combination with one of the other three arrangements enumerated hereinabove.

At the instant of impact, the dock transmits to the ship a reaction which is inversely proportional to the deformation of the shock absorbing means.

An important characteristic of an efficient shock absorber is the ability to withstand a substantial deformation. Another desirable characteristic is that for the same movements of the ship the absorber will react in the same manner whatever may be the level of the water about the dock. This is possible with an absorber which is movable strictly in accordance with the rise and fall of the water level. Shock absorbers known heretofore, however, do not very often satisfy these two conditions at the same time.

There are raft type shock absorbers which follow the movements of the surface of the water in a port where rise and fall of the tide takes place, or of the water in a lock, but these types of movable shock absorbers are only capable of small deformation. For example, in the port of New York, rafts made of tree trunks are employed as shock absorbers which may be crushed during the docking operation and of which the size may be reduced ultimately to about two-thirds. The disadvantage of such a means for shock absorption is that such rafts possibly may be used only once.

Shock absorbers which are capable of withstanding great deformation, however, may be fixed to the dock itself. Such shock absorbers are generally made up of a single shock receiving element pivoting about an axis or folding upon itself as an articulated parallelogram, or of other construction.

In order to be effective whatever may be the water level, the fixed type shock absorbers must necessarily have very large vertical dimensions, ten meters or more. As a result, when, for example, the shock absorbing element is pivoted on a horizontal axis, the deformation of the shock absorber and as a result the resistance offered by the shock absorber vary with the water level to a considerable extent (1 to 4 or 5) between the possible lower and upper limits of the point of contact of the shock absorber element with the ship.

Because of their great height the shock receiving elements have a large mass, even if the resistance offered to displacement is accomplished by hydraulic or pneumatic means. This mass becomes even larger when it is the upward displacement of its center of gravity which creates the resistance to displacement at the moment of contact. It is apparent, therefore, that the fixed type shock absorbers have a high inertia. The efficiency of a shock absorber is improved according as the parts movable under the impact have a relatively small inertia.

In order to satisfy the conditions of efficiency set forth hereinabove, the invention has an object to provide a shock absorber which is movable with the variations in the level of water surface and has a large deformation capacity.

The shock absorber of the invention is characterized in that it comprises two impact receiving elements disposed in substantially the same horizontal plane and which are movable apart upon receiving the impact by pivoting in their respective supports on substantially vertical axes. For purposes of simplicity in the accompanying explanation the two impact receiving pieces are referred to as shoes.

A connecting member between the supports of the shoes opposes their separation. This connecting member may be simply elastic, for example, a tension spring. This provides a reaction dependent solely upon the degree of separation of the shoes, that is to say, the position of the ship relative to the dock. This connecting member may be a dash-pot. In that case, the connecting member produces a reaction following laws widely varying dependent on or independent of the speed of separation of the shoes.

This connecting member also may comprise at the same time an elastic or resilient member and a dash-pot acting together, the elastic member serving to provide for the return movement of the shock absorber to its initial position.

In accordance with another characteristic of the invention, the supporting members for the shoes may be articulated by one or more connections on a carriage which is capable of being moved vertically along the dockside or wall of the dock.

The invention is further characterized by the fact that the coefficient of friction of the carriage upon the wall of the dock is much less than the coefficient of friction of the shoes as they move along the side of the ship. As a result of this arrangement, once the ship has been moored, the shock absorber structure becomes in a sense fixed to the ship and not to the dock and consequently will follow the fluctuations of the level of the water surface.

The characteristics and advaneages of the invention will be understood more clearly from the description which follows relative to an embodiment of the invention which is taken merely by way of example and having reference to the accompanying drawings wherein:

Fig. 3 is a horizontal cross sectional view taken along the line III—III of Fig. 1;

Fig. 4 is a horizontal cross sectional view taken along the line IV—IV of Fig. 5 of another embodiment of the invention; and Fig. 5 is a vertical section taken on line V—V of Fig. 4.

Figure 1:
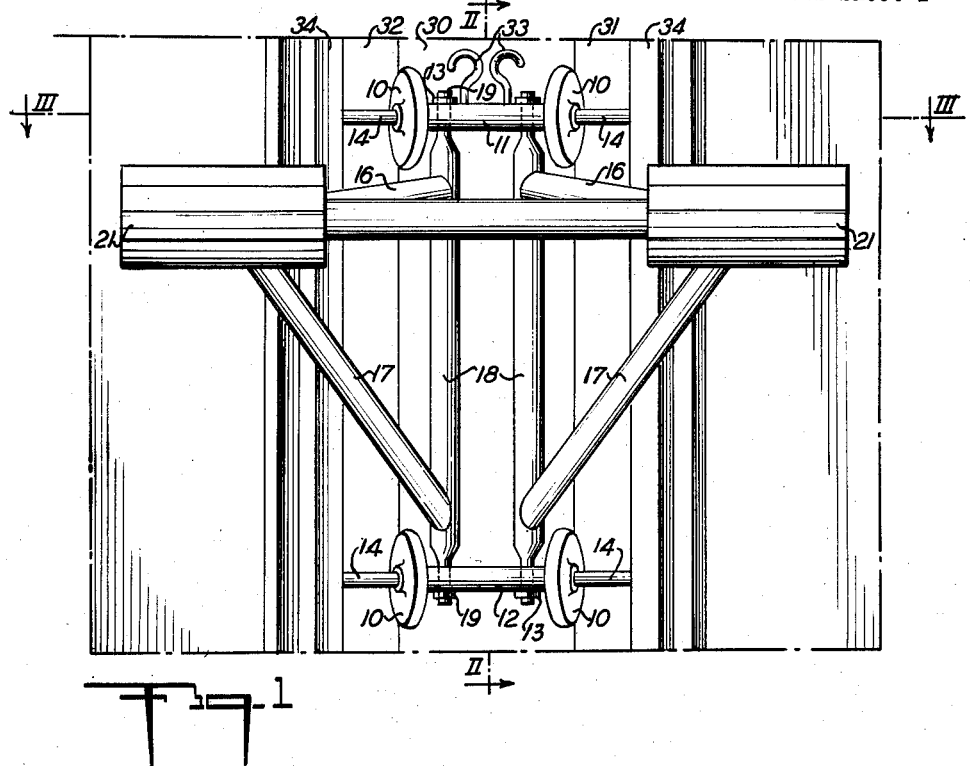
Fig. 1 is an elevational view of a shock absorber structure in accordance with this invention disposed on a dockside.
Figure 2:
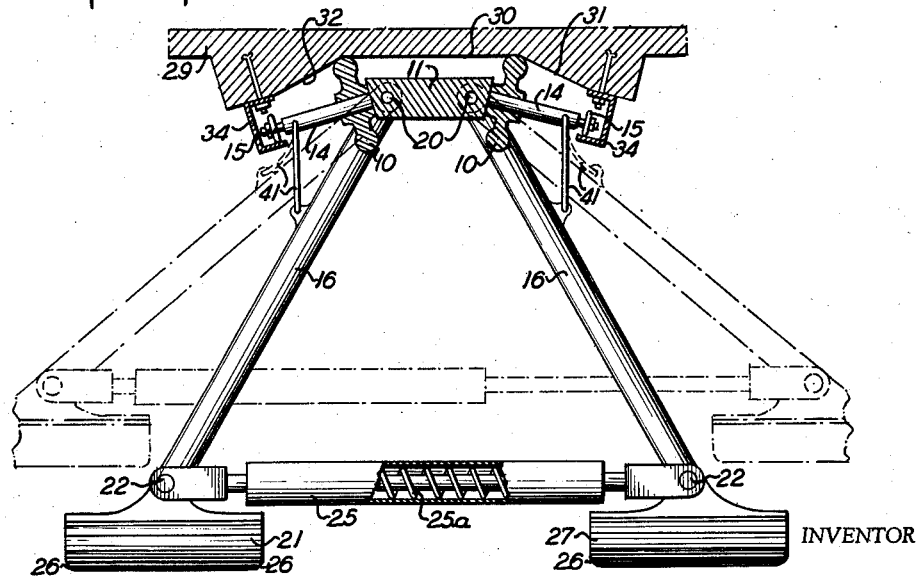
Fig. 2 is a vertical cross sectional view taken along the line II—II of Fig. 1.

As illustrated in Figs. 1, 2 and 3, the shock absorber in accordance with this invention comprises a carriage movable vertically on wheels, two triangular frames supported on the carriage for pivotal movement on vertical axes with respect to said carriage, shoes respectively connected to apexes of the triangular frames and a connecting member comprising a dash-pot and a spring disposed on a common axis and joining the two triangular frames at the apexes.

The carriage has four wheels 10 and comprises an assembly made up of two axle blocks 11 and 12 which are connected by the vertical bars 18 of the triangular frames. The axle blocks 11 and 12 at their ends carry axles 14 on which the wheels 10 rotate. These axles 14 are provided at their outer extremities with guide wheels 15. The bars of the triangular frames may be made of tubes or pipes 16, 17 and 18. The vertical pipes 18 at their extremities 19 are formed to provide trunnions which are rotatably fitted within holes 20, Fig. 3, bored in axle blocks 11 and 12. The pipes 18 are maintained in place by means of nuts 13 which, however, permit the pipes to pivot on their trunnions. The apexes of the respective triangular frames opposite pipes 18 carry shoes 21 which are pivotally movable on vertical axes 22 with respect to the triangular frames, Figs. 2 and 3.

As shown in Figs. 2 and 3 the shoes 21 each comprise a metal member 23 supported for pivotal movement on the vertical axis of pin 22. The metal member 23 is covered with a pliant facing 24, Fig. 2 for example, of wood. Adjacent the vertical pivotal axes 22 the shoes are connected by means of a connecting member comprising a dash-pot 25 and, mounted parallel therewith along the common axis, the spring 25a. The fluid operative within the dash-pot contained within the connecting member may be sea water and for the purposes of this invention the dash-pot need not be water tight. At the end of the stroke the spring becomes completely compressed and constitutes an abutment. This spring returns to its initial form and effects return movement of the triangular frames when the force exerted by the ship has ceased.

When the ship comes in contact with the shock absorber, the shoes are separated by slipping along the side of the ship. This slipping movement is possible because the triangular frames are pivotally mounted on their vertical axes in the carriage. Separation of the shoes 21 and of the supporting frames is accompanied by a displacement of those elements in the direction toward the dock side and at the same time the spring 25a is expanded and braking resistance is afforded by the dash-pot. At the end of the forward movement under the impact of the ship, the shock absorber assembly assumes the position indicated by the dotted lines shown in Fig. 3.

The characteristics of the dash-pot are chosen having regard to the maximum dynamic force expected to be received from a ship at the movement of impact, so as to produce a substantial deformation of the apparatus necessary for absorption of the shock under the best conditions, that is to say, without the reaction of the shock exceeding a given limit above which it would become dangerous for the ship and for the dock.

The energy equivalent to the dynamic force of the ship at the movement of impact is absorbed in part by the friction of the contact shoes as they move along the hull of the ship but espectially by the braking due to the dash-pot and to a lesser extent by the elasticity of the spring.

The wood facing 24 on the contact shoes 21 is rounded at its edges in order to prevent the contact shoes from being arrested in their sliding movement by the various projections on the side of the ship such as the rivets, bolts, etc.

In order to insure the slipping of the contact shoes along the side of the ship, the dihedral angle formed between the two supporting frames for the contact shoes when at rest should be greater than the angle at the apex of the cone of friction of the facing 24 bearing on the side of the ship, that is to say, one half the dihedral angle should be not less than the angle of repose.

The contact shoes 21 are pivotally movable on vertical axes through a limited angle so as to press flat against the side of the vessel under push of the shock absorber element, which requires that they be able automatically to adjust their position with respect to their supports.

In vertical cross section the contact surface of the shoes in accordance with the invention have a curvature such that the contact between the hull of the ship and the shoes always lies along the common plane tangent to the side of the ship. In the neighborhood of the water line this plane may be substantially vertical, as at line 27, Fig. 2, at the central portion of the side of the ship but toward the stern of the ship this plane may be substantially inclined to the vertical as at line 28 of Fig. 2.

The impacts received by the contact shoes are transmitted to pipes 16 and 17 and then to the carriage by means of the pivoted tubes 18 and finally to the dock side 29 by wheels 10.

The four points of contact of the wheels upon the side of the dock define a rectangle of support for the carriage. In accordance with this invention the lateral spacing of the wheels and the length of the wheel base of the carriage are determined so that the resultant of the forces transmitted by the contact shoes at the moment of shock falls within this rectangle of support. This determination can be made by determining the possible angles at which the ship will be disposed with respect to the dock as it comes alongside during docking as well as the limits of speed of approach to the dock.

In accordance with this invention the track on which the carriage rolls in a vertical direction along the wall of the dock may be provided by a plane surface 30 parallel to the side of the dock and having a width equal to the lateral spacing of the wheels and by two plane surfaces 31 and 32 inclined to the surface 30 at such an angle as to stabilize the carriage against any lateral displacement.

In accordance with the invention, the wheels 10 are disposed in such a manner such that they lie in planes which bisect the angles formed by the surface 30 of the dock wall with each of the inclined surfaces 31 and 32.

The angles of inclination of the pipes 16 and 17 with respect to the vertical pipe 18 are chosen having regard to the limit planes 27 and 28 above referred to along which the hull makes contact with the face of the contact shoes.

In accordance with this invention the shock absorber follows the vertical movements of the ship after engagement therewith. Accordingly, on the one hand, the shock absorber structure may be made buoyant by means of caissons or floats which the several hollow pipes, especially pipes 16, 17 and 18, which go to make up the shock absorber structure may provide. The buoyancy of the structure may be adjusted to the conditions by ballasting or by the addition of an auxiliary caisson if necessary. As seen hereinabove, the shock absorber structure, on the other hand, is mounted on wheels so that the friction between the vessel and the contact shoes is always greater than between the dock wall and the wheels of the shock absorber structure.

At the moment of impact due to engagement, if the engagement takes place along that portion of the hull of the vessel which is substantially inclined to the vertical, there is the possibility that the shock absorber will be pushed downwardly and as a result the ship may strike against the dock wall. In accordance with the invention, therefore, the shock absorber structure during the docking operation will be retained at the upper part of the dock by means of a chain or sling fixed, on one hand, to a suitable support on the dock and, on the other hand, to hooks 33 which are provided for this purpose on the upper axle block 11 of the carriage.

In order to prevent the shock absorber structure from see-sawing or being displaced before engagement by the ship because of currents, there is provided in accordance with the invention means for vertically guiding the carriage. For this purpose the ends of the axles of the wheels 10 carry small guide wheels 15 which are adapted to ride along the flanges of the U shaped structural members or channels 34 fastened to the wall of the dock.

For the proper functioning of the shock absorber it is necessary that when not engaged the supports or frames for the contact shoes shall be equally inclined with respect to the wall of the dock so that from one cause or another, for example the current, the shock absorber assembly may not be pivotally moved with respect to the carriage. For this reason the tubes 16 are connected to the extended ends of the axles 14 of the wheels 10 of the carriage by means of cables or chains 41 in such a manner that the desired separation of the contact shoes under impact is not impeded.

At intervals along the dock wall the tracks for vertical rolling movement of the carriages as described will be disposed and provided with channel iron guiding members 34. Prior to the docking of a ship two or more shock absorbers constructed in accordance with this invention are installed at the place along the dock side where the ship is to be docked. In the case of fixed type shock absorbers it would have been necessary to provide as many shock absorbers as docking positions along the dock side.

Another arrangement for vertically guiding the shock absorber structure, as shown in Figs. 4 and 5, comprises means for holding the carriage in position against the dock and for movement thereof along a line perpendicular to the surface of the water, this means comprising a system of ties 35 fixed, for example, to the axle blocks 11 and 12 and movable in a slot 36 located in the concrete wall of the dock. This system may be composed of rods 35 under tension which respectively are fixed to the center of the axle blocks 11 and 12. These rods in turn are fixed at their other ends to a shoe 38 which is adapted to move up and down within a vertical shaftway 37 of suitable form provided within the dock structure. In this case the chain which connects the extension of the axles 14 of the wheels to the pipes 16 may be replaced by an abutment lever 39 fixed to each pipe 18 and adapted to bear upon the other pipe 18 when the pivoted frames are drawn by the spring to the position of repose and the shock absorber is not in operation.

The shock absorber of the invention disposed adjacent a dock side and provided with means engaging the dock structure for vertical movement of the shock absorber in the manner above described may be carried upon a floating member which may rise and fall with rise and fall of the water level occurring with the ebb and flow of tide, or variation of the water level in a lock or for other reasons. Such floating support of the shock absorber takes the place of suspending the shock absorber structure, as by a davit or crane connected to the hooks 33 of Fig. 1, and the shock absorber will maintain its position with respect to the hull of the ship regardless of the level of the water.

The shock absorber structure itself of the invention which is movable vertically in response to or to correspond with the level of the water may be provided with a bitt or bitts for securing the hawsers connected to the ship in mooring. The length of these hawsers between the ship and the bitts then may remain substantially constant regardless of the rise and fall of the water level since the shock absorber structure itself, especially when supported on a floating member as above mentioned, is movable vertically over the dock side to correspond with the vertical movement of the ship and may be retained in a constant relation to the side of the hull of the ship.

It will be understood that the invention is not limited to the particular embodiment described and shown in the drawings but includes all modifications which provide a shock absorber having a contact shoe supported for movement transversely of the dock side and so as to maintain the contact surface of the shoe in conforming engagement with the hull of the ship, especially a shock absorber having two shoes pivotally movable apart upon their support under the impact of the ship, and an elastic means acting to oppose such pivotal movement.

I claim:

1. A shock absorber for docks and the like which comprises a shoe providing a contact surface for engaging the hull of a ship, means for supporting said shoe upon and outwardly from the dock side and for pivotal movement of said shoe to different angularly related positions about a vertical axis disposed adjacent the dock side, said shoe being supported by said means in horizontally offset relation to the perpendicular to the dock side through said axis to provide for movement of said shoe generally horizontally transversely of the dock side concomitantly with said pivotal movement of said shoe upon engagement of the contact surface of said shoe with the hull of the ship, and means operatively connected to said shoe and to said supporting means for resisting said transverse movement of said shoe toward the dock side under impact of the ship upon said shoe.

2. A shock absorber for docks and the like which comprises a member supported by the dock side for pivotal movement of said member on an axis disposed adjacent the dock side and extending generally vertically to positions of said member in different angular relations to the direction parallel to the horizontal length of the dock side, said member extending outwardly from said pivotal axis away from the dock side, a contact shoe supported by said member outwardly thereon from said pivotal axis and horizontally offset from the perpendicular to the dock side through said axis so as to engage the hull of a ship and to move toward the dock side concomitantly with pivotal movement of said member upon impact of the ship on said shoe, and means operatively connected to said member and to the dock side for resiliently resisting said pivotal movement of said member and movement of said shoe toward the dock side.

3. A shock absorber for docks and the like which comprises a carriage disposed adjacent the vertical face of the dock side, means for supporting said carriage for vertical movement thereof upwardly and downwardly over said face of the dock side, a pair of frames each supported on said carriage for pivotal movement thereof on a vertical axis to different angularly related positions with respect to each other and to the dock side, said frames extending generally in opposite directions along the dock side and outwardly from said pivotal axes in cantilever relation to said carriage, a shoe for each frame supported thereon outwardly with respect to said carriage for engagement with the hull of a ship and for movement with said frame to different positions relative to the dock side upon said pivotal movement of said frame, and means resiliently connecting said frames at points disposed outwardly from said pivotal axes and resisting separating movement of said frames with respect to each other, whereby upon impact of the ship upon said shoes said frames are moved in separating movement against said resilient means concomitantly with sliding movement of said shoes along the hull of the ship.

4. A shock absorber for docks and the like as defined in claim 3 which comprises means connecting said carriage to the respective frames for limiting the pivotal movement of said frames toward each other away from the dock side.

5. A shock absorber for docks and the like which comprises a track supported by the dock structure at a vertical face of the dock side and extending vertically along said face, a carriage, means carried by said carriage and supporting thereon a wheel engaging said track and rolling along said track concomitantly with vertical movement of said carriage along said track over said face of the dock side, a pair of frames respectively supported on said carriage for pivotal movement thereof on vertical axes relative to said carriage to different angularly related positions with respect to each other and to the dock side, said frames extending generally in opposite directions along the dock side and outwardly from said pivotal axes in cantilever relation to said carriage, a shoe for each frame supported thereon outwardly with respect to said carriage for engagement with the hull of a ship and for movement with its frame to different positions relative to the dock side upon said pivotal movement of said frame on its vertical axis, and means resiliently connecting said frames at points disposed outwardly from said pivotal axes and resisting separating movement of said frames with respect to each other, whereby upon impact of the ship upon said shoes said frames are moved in separating movement against said resilient means and said carriage may move vertically concomitantly with sliding movement of said shoes over the hull of the ship.

6. A shock absorber for docks and the like as defined in claim 5 in which said means supporting said wheel on said carriage comprises an axle carried by said carriage, said wheel being rotatable on said axle.

7. A shock absorber for docks and the like as defined in claim 6 in which said axle projects from said carriage generally horizontally along said face of the dock side, and means carried by the dock structure and extending generally vertically along said face of the dock side and engaging the outer end of said axle in guiding bearing relation thereto to prevent movement of the axle and carriage outwardly with respect to the dock side.

8. A shock absorber for docks and the like as defined in claim 7 which comprises a flexible connector between said axle and the adjacent frame and capable of tension strain for limiting the pivotal movement of said frame with respect to said axle and carriage in a direction away from the dock side.

9. A shock absorber for docks and the like as defined in claim 3 in which said frames each comprises a vertically extending frame element provided with trunnions at the upper and lower ends thereof, bearings carried by said carriage and respectively engaging said trunnions of said frame elements for pivotal movement of said vertically extending elements and of said frames respectively on said vertical axes.

10. A shock absorber for docks and the like as defined in claim 3, said shoes each comprising a member carrying a pliant covering for engaging the hull of the ship, a pivot pin supported by said frame and supporting said member for pivotal movement of said member and shoe on a vertical axis with respect to said frame with said pliant covering engageable by the ship.

11. A shock absorber for docks and the like as defined in claim 3 which comprises a slider member connected to said carriage for vertical movement therewith, said slider member being formed to engage and engaging a vertically extending surface of a shaftway formed in the dock structure for restraining said carriage against movement thereof away from the dock side.

12. A shock absorber for docks and the like as defined in claim 1 in which said supporting means is supported for movement thereof generally vertically over the dock side, and buoyant means connected to said supporting means and capable of floatably supporting said shock absorber upon said vertical movement thereof against sinking in the water.

13. A shock absorber for docks and the like as defined in claim 3 which comprises a hollow member capable of floating and connected to said carriage for floatably sustaining the weight of said shock absorber and preventing sinking thereof in the water upon downward movement thereof.

14. A shock absorber for docks and the like as defined in claim 5 in which said means carried by said carriage supports two pairs of wheels, the wheels of one of said pairs being disposed symmetrically with respect to the wheels of the other pair at opposite sides of a vertical center line along said track, the two wheels of each pair being in general alignment with each other along said track, the spacing of the wheels of one pair from the wheels of the other pair transversely of the length of the track and the spacing of the wheels of each pair along the track being such that said wheels engage the track at points disposed about the resultant of the forces of the impact received by said shoes and transmitted through said frames and wheels to the track.

15. A shock absorber for docks and the like as defined in claim 5 in which said means carried by said carriage supports two wheels disposed at opposite sides of and transversely spaced symmetrically with respect to a center line along the length of said track and comprises axles respectively for said wheels for rotation of said wheels on said axles on axes extending generally horizontally and symmetrically at angles with respect to the face of the dock side, said track having a form with respect to said transversely spaced wheels and with respect to the angularity of their axes such that said wheels each engages surfaces of said track that are disposed in planes respectively generally parallel to the dock side and generally parallel to the respective axes of said axles.

16. A shock absorber as defined in claim 3 in which said shoes are supported on the respective frames for pivotal movement of said shoes with respect to the respective frames.

References Cited in the file of this patent

UNITED STATES PATENTS

| 876,170 | Grant | Jan. 7, 1908 |
| 1,182,400 | Montonari | May 9, 1916 |
| 1,997,586 | Kingman | Apr. 16, 1935 |
| 2,417,849 | Walters et al. | Mar. 25, 1947 |

FOREIGN PATENTS

| 22,772 | Great Britain | 1912 |
| 618,660 | France | 1926 |
| 819,228 | Germany | Oct. 31, 1951 |
| 1,031,969 | France | Mar. 25, 1953 |